(12) United States Patent
Wu (10) Patent No.: US 10,322,738 B1
(45) Date of Patent: Jun. 18, 2019

(54) COLLAPSIBLE STRUCTURE FOR INTERLINKING FRONT AND REAR WHEELS OF GOLF CART

(71) Applicant: SPORTS WORLD ENTERPRISE CO., LTD., Tainan (TW)

(72) Inventor: Fang-Li Wu, Tainan (TW)

(73) Assignee: Sports World Enterprise Co., Ltd., Tainan (TW)

( * ) Notice: Subject to any disclaimer, the term of this patent is extended or adjusted under 35 U.S.C. 154(b) by 0 days.

(21) Appl. No.: 16/053,972

(22) Filed: Aug. 3, 2018

(51) Int. Cl.
  *B62B 3/12* (2006.01)
  *B62B 3/02* (2006.01)
  *B62B 5/06* (2006.01)

(52) U.S. Cl.
  CPC .............. *B62B 3/022* (2013.01); *B62B 3/12* (2013.01); *B62B 5/067* (2013.01); *B62B 2202/404* (2013.01); *B62B 2205/123* (2013.01)

(58) Field of Classification Search
  CPC .......... B62B 3/022; B62B 3/12; B62B 5/067; B62B 2202/404; B62B 2205/12; B62B 2205/123
  USPC ................... 280/639, 642, 647, 650, 658
  See application file for complete search history.

(56) References Cited

U.S. PATENT DOCUMENTS

| 7,137,644 | B2* | 11/2006 | Kimberley | B62B 3/12 |
| | | | | 280/651 |
| 8,104,777 | B2* | 1/2012 | Liao | B62B 3/02 |
| | | | | 280/38 |
| 8,292,321 | B2* | 10/2012 | Liao | B62B 3/02 |
| | | | | 280/47.26 |
| 8,500,140 | B1* | 8/2013 | Liao | B62B 7/10 |
| | | | | 280/38 |
| 9,004,505 | B1* | 4/2015 | Wu | B62B 3/022 |
| | | | | 280/38 |
| RE46,150 | E * | 9/2016 | Liao | B62B 3/02 |
| 9,764,752 | B2* | 9/2017 | Liao | B62B 3/025 |
| 2010/0090443 | A1* | 4/2010 | Liao | B62B 3/12 |
| | | | | 280/651 |
| 2017/0327140 | A1* | 11/2017 | Liao | B62B 3/025 |

* cited by examiner

*Primary Examiner* — John D Walters
(74) *Attorney, Agent, or Firm* — Rosenberg, Klein & Lee (57) ABSTRACT

A collapsible structure for interlinking front and rear wheels of a golf cart is disclosed herein. It comprises an upper frame having two shaft racks, two handles and a supporting rod; a lower frame pivotally connected to the supporting rod and having a first assembling seat pivotally connected to the two shaft racks, two sliding sleeves, each having an upper connecting rod, a rear wheel joint rod and a front wheel push rod, and a second assembling seat having an oblique guide slot and a guiding tooth row in the oblique guide slot for connection to the front wheel push rod; two rear wheel assemblies connected to the two rear wheel joint rods; and a front wheel assembly comprising a guide rod having an annular teeth for engaging with the guiding tooth row in the oblique guide slot.

4 Claims, 8 Drawing Sheets

COLLAPSIBLE STRUCTURE FOR INTERLINKING FRONT AND REAR WHEELS OF GOLF CART

BACKGROUND OF THE INVENTION

1. Field of the Invention

The present invention relates to a collapsible structure for interlinking front and rear wheels of a golf cart which can be easily and quickly opened or closed and has an increased practicality in its overall application.

2. Description of Related Art

In order to carry a large bag of clubs and golf balls, a traditional golf trolley usually has a large volume, making it inconvenient in storage. To solve this problem, many foldable and bendable golf carts have been developed.

Although the abovementioned foldable and bendable golf carts can achieve the expected effects of reducing the volume and facilitating storage, the front wheel, the rear wheel, the frame and their other parts need to be respectively expanded and folded by manual. In other words, the parts of the foldable and bendable golf cart are not interlinked to each other to actuate, so they cannot be spread or bent at the same time. Therefore, the above structures are not convenient in use and still need to be improved in the overall structural design.

SUMMARY OF THE INVENTION

In view of the above-mentioned problems, the object of the present invention is to provide a collapsible structure for interlinking front and rear wheels of a golf cart which has an upper frame for simultaneously and automatically interlinking the rear wheels and the front wheel and driving them to bend toward the lower frame or expand outwardly during a folding or unfolding process thereof so as to increase convenience in its overall application.

DETAILED DESCRIPTION OF THE PREFERRED EMBODIMENT

Hereinafter, an exemplary embodiment of the present invention will be described in detail with reference to the accompanying drawings.

As showed in FIG. 1, FIG. 2, FIG. 3, and FIG. 4, a collapsible structure for interlinking front and rear wheels of a golf cart according to the present invention is disclosed herein. It mainly comprises an upper frame (1), a lower frame (2), two rear wheel assemblies (3), and a front wheel assembly (4).

The upper frame (1) is provided with two shaft racks (11), two handles (12) pivotally connected to tops of the two shaft racks (11), a positioning unit (13) between the two shaft racks (11) and the two handles (12), and a supporting rod (14) pivotally connected to the two handles (12). The positioning unit (13) is further provided with a positioning lever (131) connected to the tops of the two shaft racks (11) and a positioning groove (132) connected to bottoms of the two handles (12), the positioning lever (131) is used to control the positioning groove (132) to be positioned or not.

The lower frame (2) is provided with a first assembling seat (21) for pivotally connecting bottoms of the two shaft racks (11) of the upper frame (1), a front end, a rear end pivotally connected to the supporting rod (14) of the upper frame (1), two assembling rods (22) respectively protruded from two sides of the first assembling seat (21), two sliding sleeves (23), and a second assembling seat (24). Each of the two sliding sleeves (23) is provided with an upper connecting rod (231) pivotally connecting each of the two shaft racks (11) of the upper frame (1), a first universal joint (232) on its lateral, a rear wheel joint rod (233) connected to the first universal joint (232), and a front wheel push rod (234). The second assembling seat (24) is provided with an oblique guide slot (241) at its bottom for receiving a front end of the front wheel push rod (234) of each of the two sliding sleeves (23), and a guiding tooth row (242) in the oblique guide slot (241) for connecting the front end of the front wheel push rod (234).

Each of the two rear wheel assemblies (3) is provided with a fixing base (31) for fixing on each of the two assembling rods (22) of the lower frame (2), a bending seat (32) pivotally connected to an outer end of the fixing base (31), and a rear wheel (33) pivotally connected to an outer end of the bending seat (32). The bending seat (32) of each of the two rear wheel assemblies (3) is further provided with a second universal joint (321) relative to the rear wheel joint rod (233) of the lower frame (2) for correspondingly contenting the rear wheel joint rod (233).

The front wheel assembly (4) is provided with a front wheel rack (41), a guide rod (42) corresponding to the oblique guide slot (241) of the second assembling seat (24), and a front wheel (43) pivotally connected to the front wheel rack (41). The guide rod (42) is further provided with a pivot hole (421) at its top end, a pivot member (422) inserted into the pivot hole (421) for pivotal connection with the oblique guide slot (241), and an annular teeth (423) formed on an outer rim of the pivot hole (421) for correspondingly engaging with the guiding tooth row (242) in the oblique guide slot (241).

Figure 1:
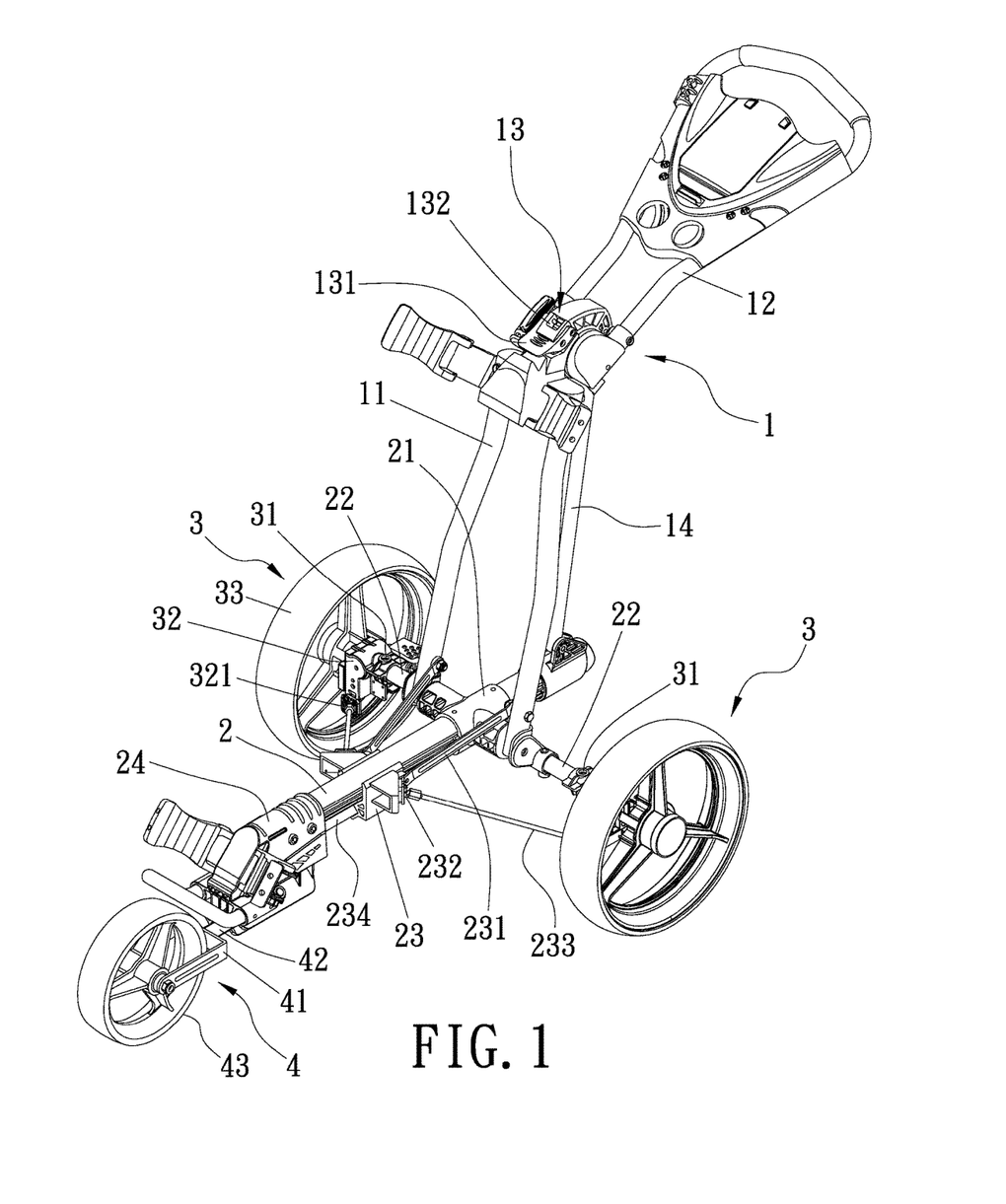
FIG. 1 is a stereogram showing a collapsible structure for interlinking front and rear wheels of a golf cart according to the present invention.
Figure 2:
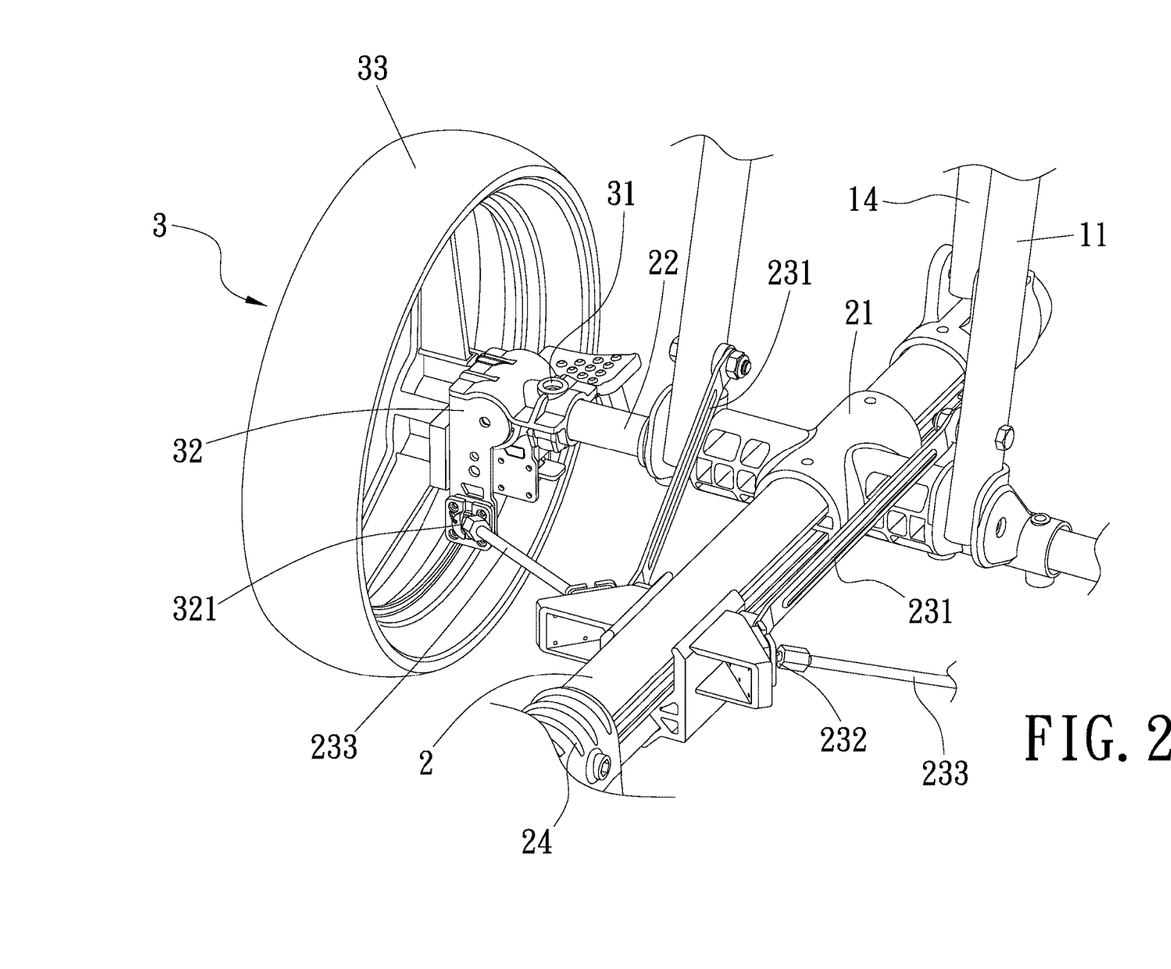
FIG. 2 is a partial stereogram showing a collapsible structure for interlinking front and rear wheels of a golf cart according to the present invention.
Figure 3:
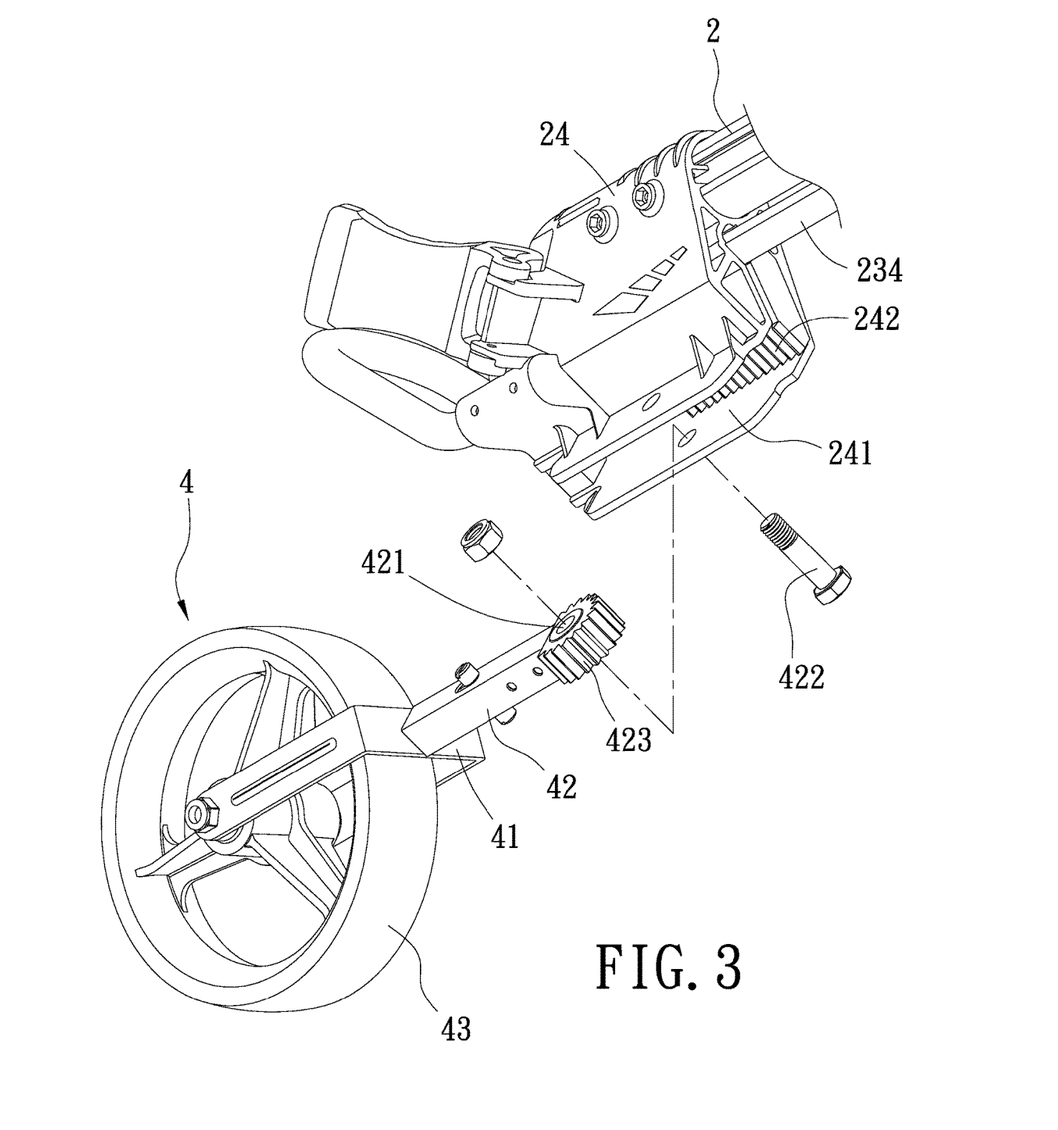
FIG. 3 is a partial explosion diagram showing a collapsible structure for interlinking front and rear wheels of a golf cart according to the present invention.
Figure 4:
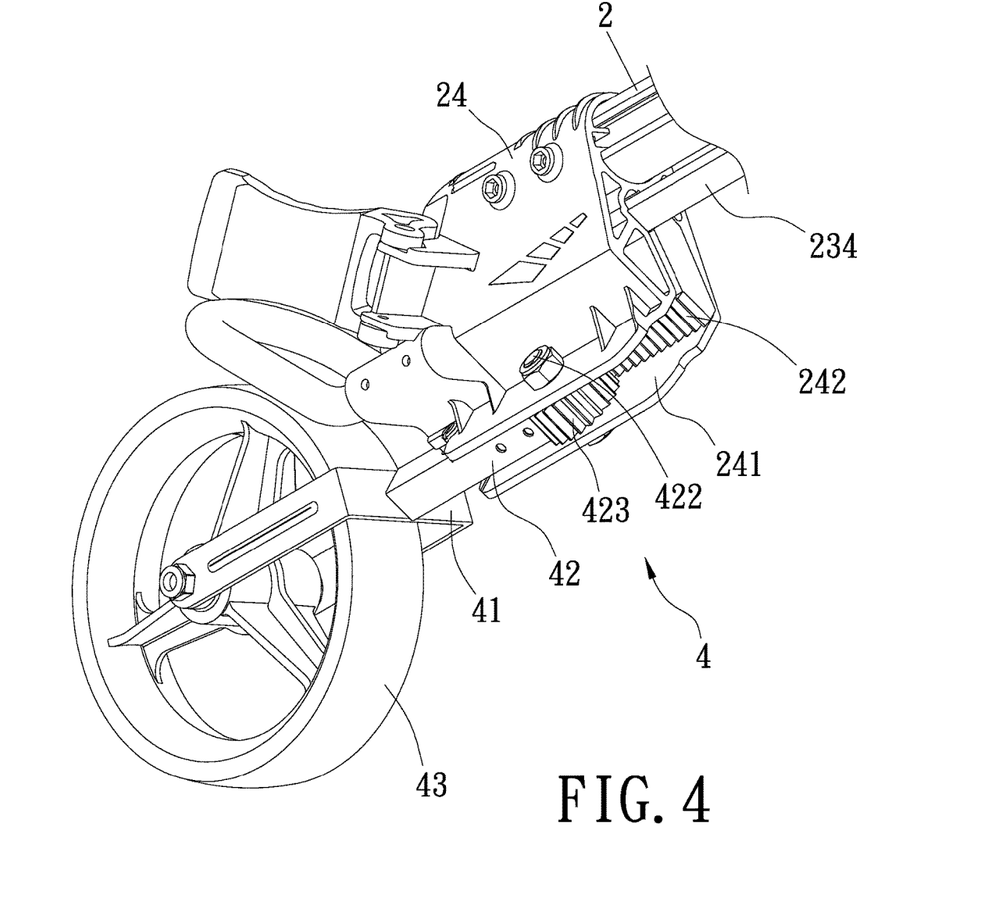
FIG. 4 is a partial stereogram showing a collapsible structure for interlinking front and rear wheels of a golf cart in assembly according to the present invention.
Figure 5:
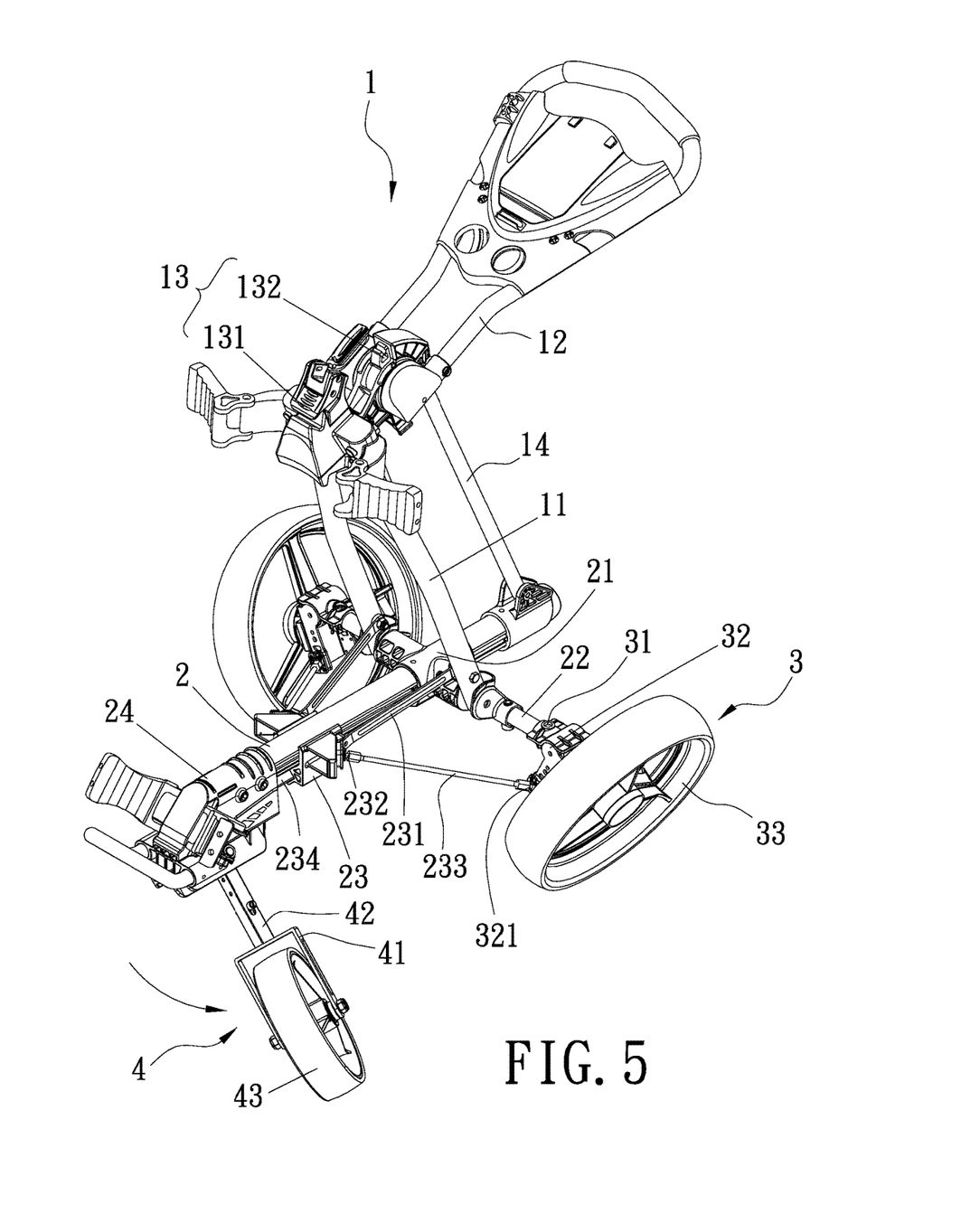
FIG. 5 is a first schematic diagram showing a collapsible structure for interlinking front and rear wheels of a golf cart in a folding state according to the present invention.
Figure 6:
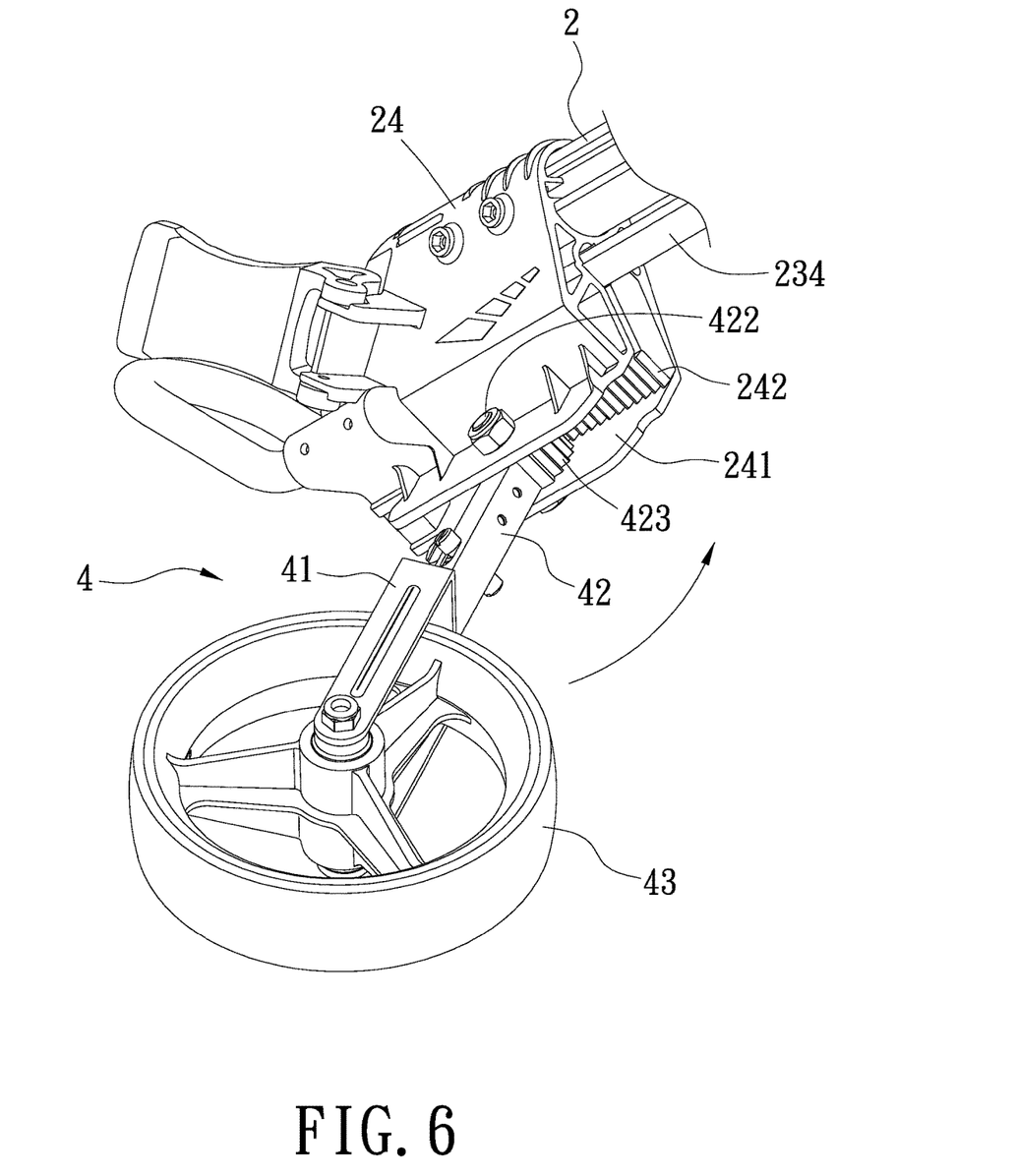
FIG. 6 is a schematic diagram showing a folding action of a front wheel assembly according to the present invention.
Figure 7:
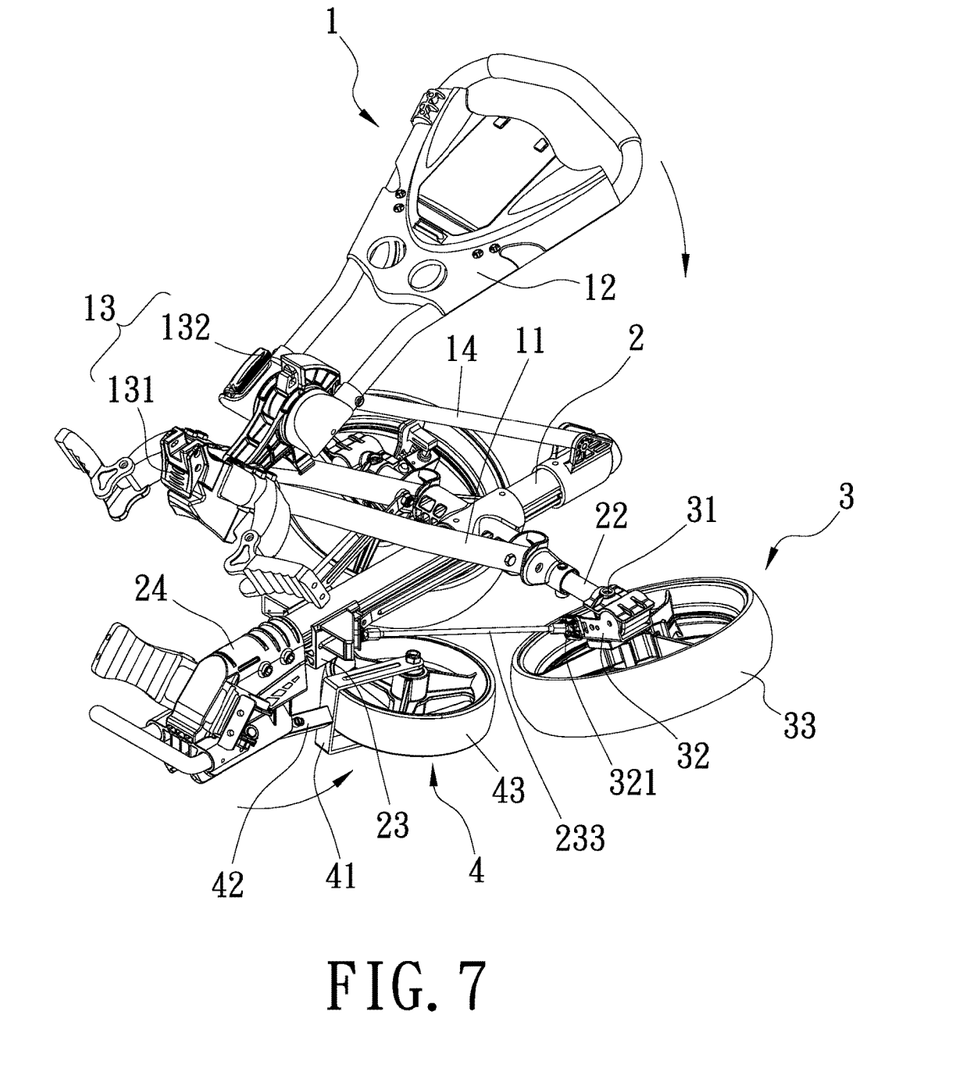
FIG. 7 is a second schematic diagram showing a collapsible structure for interlinking front and rear wheels of a golf cart in a folding state according to the present invention.

Referring to FIG. 5, a first schematic diagram showing a collapsible structure for interlinking front and rear wheels of a golf cart in a folding state according to the present invention is disclosed. When the golf cart is not used and to be stored, the positioning state of the two shaft racks (11) and the two handles (12) is released by the positioning unit (13); and then the two shaft racks (11) are push forward to allow the two handles (12) to bend downwardly at the same time due to the two handles (12) pivotally connected to the tops of the two shaft racks (11) and the supporting rod (14) which is pivotally connected to the rear end of the lower frame (2). In the process of pushing the two shaft racks (11) forward, the two sliding sleeves (23) are also pushed forward by the two upper connecting rods (231) of the lower frame (2) due to the two upper connecting rods (231) being subject to a push of the two shaft racks (11). When the two sliding sleeves (23) move forward, the two rear wheel joint rods (233) also move forward synchronously with the two sliding sleeves (23). Due to the connection of the two rear wheel joint rods (233) to the two second universal joints (321) of the two bending seats (32) of the two rear wheel assemblies (3), the two bending seats (32) together with the two rear wheels (33) at the outer ends of the two bending seats (32) are bent downwardly at the same time with the movement of the two rear wheel joint rods (233). At the same time of the movement of the two sliding sleeves (23), the guiding tooth row (242) in the oblique guide slot (241) of the second assembling seat (24) is pushed forward by the two front wheel push rods (234) extended from the two sliding sleeves (23), so that the guiding tooth row (242) is correspondingly engaged with the annular teeth (423) at the top end of the guide rod (42) of the front wheel assembly (4), and the annular teeth (423) is pushed by the guiding tooth row (242). In a case of the annular teeth (423) being pushed by the guiding tooth row (242), the guide rod (42) is rotated in the oblique guide slot (241) as shown in FIG. 6. As the two shaft racks (11) are pushed forward and bent downward to contact the lower frame (2), the two sliding sleeves (23) continues to move forward so that the two bending seats (32) are bent downward by a pull of the two rear wheel joint rods (233). At the same time, the two rear wheels (33) at the outer ends of the two bending seats (32) are bent downward to contact a bottom of the lower frame (2). Furthermore, since the oblique guide slot (241) of the second assembling seat (24) is inclined, the front wheel rack (41) is rotated 90 degrees during the rotation of the guide rod (42) in the oblique guide slot (241), and the front wheel (43) is further driven by the front wheel rack (41) to rotate downward to contact the bottom of the lower frame (2) as shown in FIG. 7.

Figure 8:
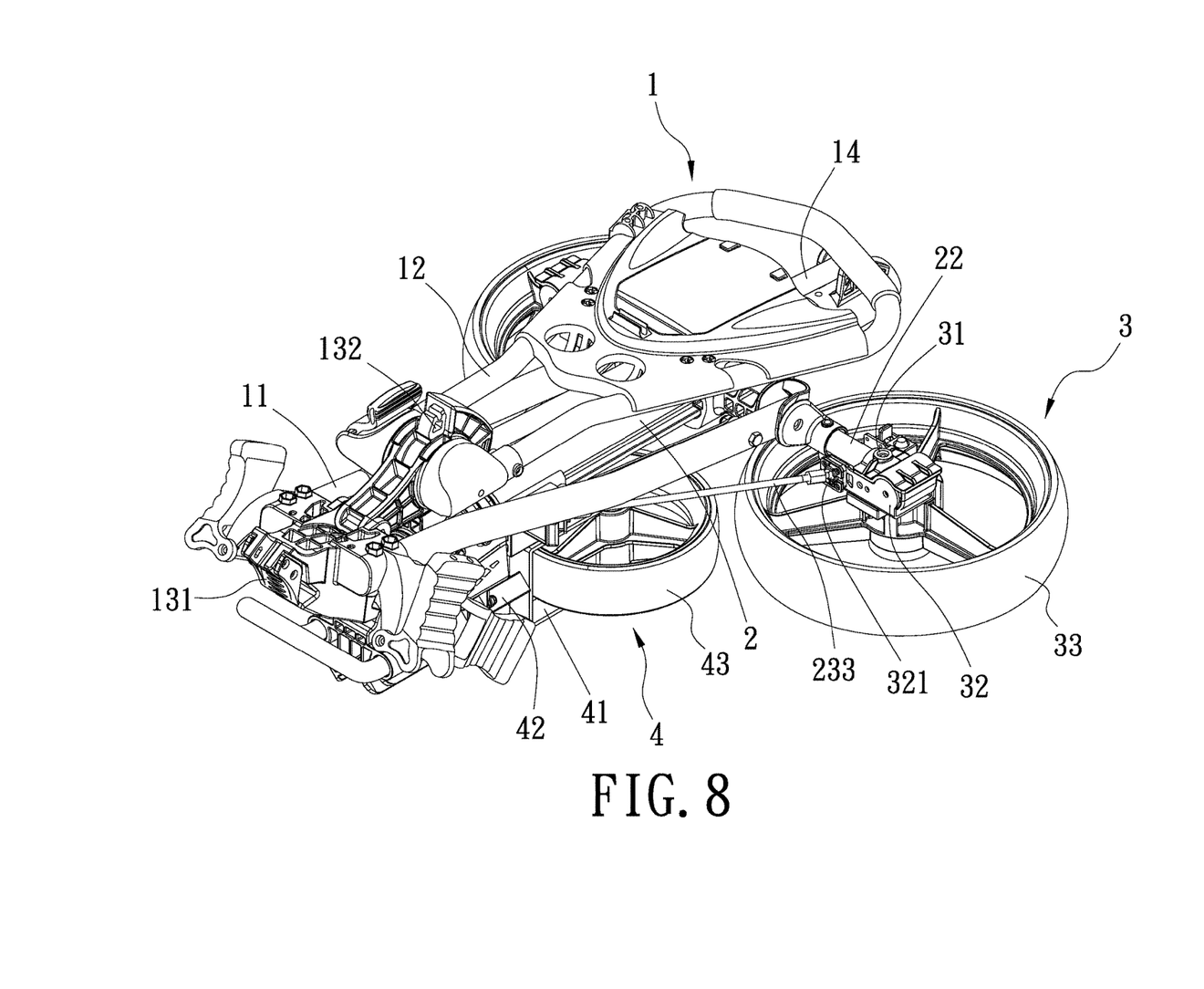
FIG. 8 is a schematic diagram showing a complete folding state of a collapsible structure for interlinking front and rear wheels of a golf cart according to the present invention.

In a complete folding state as shown in FIG. 8, the two shaft racks (11) are completely in contact with the lower frame (2), and the two handles (12) and the two rear wheels (33) are respectively in contact with the top and the bottom of the lower frame (2). Furthermore, the front wheel (43) is horizontally in contact with the bottom of the lower frame (2). For unfolding the present invention, the two handles (12) are pulled upward to drive the two shaft racks (11) to move upward, the two rear wheels (33) to bend outward, and the front wheel (43) to bend forward, so that the whole structure can be expand simultaneously. Finally, the positioning unit (13) between the two shaft racks (11) and the two handles (12) is positioned to complete an unfolding action.

Compared with the technique available now, the present invention has the upper frame for simultaneously and automatically interlinking the rear wheels and the front wheel and driving them to bend toward the lower frame or expand outwardly during the folding or unfolding process, so it also increases the convenience of use.

What is claimed is:

1. A collapsible structure for interlinking front and rear wheels of a golf cart, comprising:
    an upper frame having two shaft racks, two handles pivotally connected to tops of the two shaft racks, a positioning unit between the two shaft racks and the two handles, and a supporting rod pivotally connected to the two handles;
    a lower frame having a first assembling seat for pivotally connecting bottoms of the two shaft racks, a front end, a rear end pivotally connected to the supporting rod of the upper frame, two assembling rods respectively protruded from two sides of the first assembling seat, two sliding sleeves, and a second assembling seat at the front end thereof, wherein each of the two sliding sleeves is provided with an upper connecting rod pivotally connecting each of the two shaft racks of the upper frame, a first universal joint, a rear wheel joint rod connected to the first universal joint, and a front wheel push rod, and wherein the second assembling seat is provided with an oblique guide slot at a bottom thereof for receiving a front end of the front wheel push rod of each of the two sliding sleeves, and a guiding tooth row in the oblique guide slot for connecting the front end of the front wheel push rod;
    two rear wheel assemblies, each having a fixing base for fixing on each of the two assembling rods of the lower frame, a bending seat pivotally connected to an outer end of the fixing base, and a rear wheel pivotally connected to an outer end of the bending seat, wherein the bending seat is further provided with a second universal joint for correspondingly connecting the rear wheel joint rod of the lower frame; and
    a front wheel assembly having a front wheel rack, a guide rod corresponding to the oblique guide slot of the second assembling seat, and a front wheel connected to the front wheel rack, wherein the guide rod is further provided with a pivot hole at a top end thereof, a pivot member inserted into the pivot hole for pivotal connection with the oblique guide slot, and an annular teeth formed on an outer rim of the pivot hole for correspondingly engaging with the guiding tooth row in the oblique guide slot.

2. The collapsible structure for interlinking front and rear wheels of a golf cart as claimed in claim 1, wherein the two shaft racks of the upper frame are arranged corresponding to each other.

3. The collapsible structure for interlinking front and rear wheels of a golf cart as claimed in claim 1, wherein the positioning unit is further provided with a positioning lever connected to the tops of the two shaft racks and a positioning groove connected to bottoms of the two handles and controlled by the positioning lever to be positioned or not.

4. The collapsible structure for interlinking front and rear wheels of a golf cart as claimed in claim 3, wherein the two shaft racks of the upper frame are arranged corresponding to each other.

* * * * *